(No Model.)
E. SALISBURY.
SPRING CLEVIS.
No. 497,553. Patented May 16, 1893.
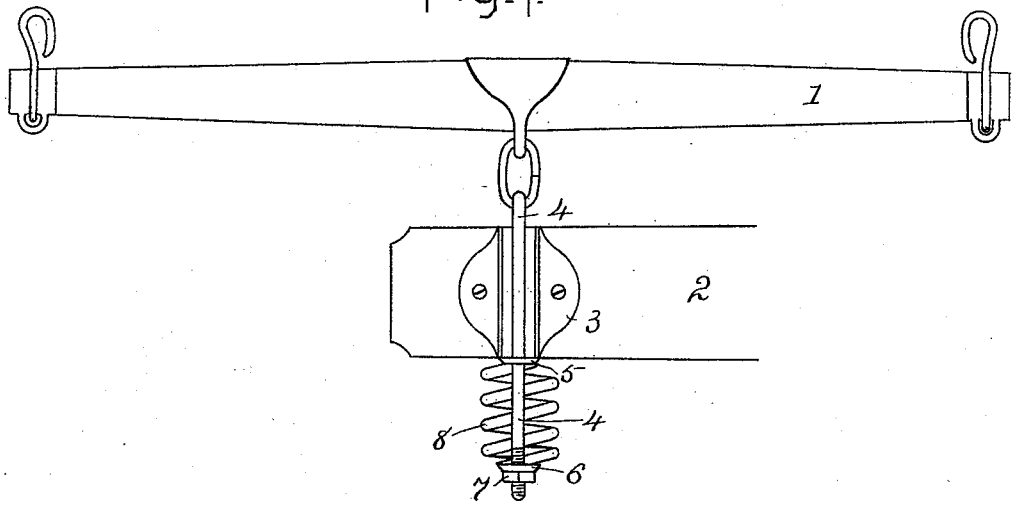
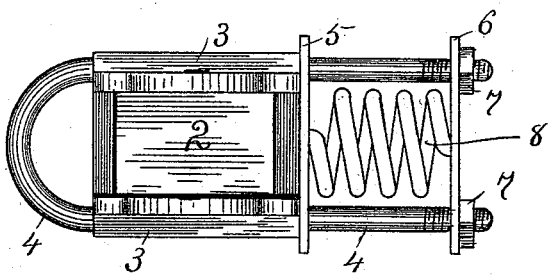
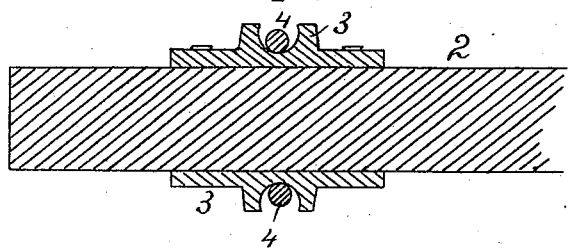
ATTEST
Helen Graham
William Graham
INVENTOR
E. Salisbury
by his attorney
L. P. Graham

UNITED STATES PATENT OFFICE.

ENOCH SALISBURY, OF BLUE MOUND, ILLINOIS.

SPRING-CLEVIS.

SPECIFICATION forming part of Letters Patent No. 497,553, dated May 16, 1893.

Application filed August 18, 1891. Serial No. 402,989. (No model.)

*To all whom it may concern:*

Be it known that I, ENOCH SALISBURY, of Blue Mound, in the county of Macon and State of Illinois, have invented certain new and useful Improvements in Spring-Clevises, of which the following is a specification.

This invention is intended to neutralize the jar or shock imparted to the shoulders of draft animals by a sudden increase in the resistance of the load, as when a plow strikes a root or a wagon an obstruction, and it consists in the details of construction and combination of parts hereinafter set forth and claimed.

In the drawings accompanying and forming a part of this specification Figure 1 is a plan of a doubletree provided with my improved clevis. Fig. 2 is an end view of the doubletree, and Fig. 3 is a vertical section lengthwise of the doubletree.

A whiffle tree is shown at 1 and an end of a double tree at 2. Guide plates 3 are secured to opposite sides of the double tree and are concaved to admit and guide the clevis. 4. Strap 5 is mounted on the clevis near the double tree, strap 6 is held on the end of the clevis by nuts 7, and spring 8 is placed between and held by the straps 5 and 6. The plates 3 permit the clevis to move freely in the direction of its length while holding it against lateral displacement, the strap 5 slides freely on the clevis, and the spring is adapted to resist the strain of an ordinary load without becoming materially depressed. When the load is from any cause suddenly increased the jar is dissipated by the spring and the extra load gradually taken up by the team.

The invention is not to be confined to the specific application herein shown, but a clevis so constructed may be used, with perhaps slight modifications in its form and arrangement, wherever an ordinary clevis is used.

I am aware, a spring clevis is not a new device, but

What I do claim as new is—

The combination, with the U-shaped clevis 4, having screw-threaded ends, of the guide-plates 3, 3, adapted for attachment to the beam, said guide-plates having grooves formed in their outer surfaces adapted to receive and guide the arms of the U-shaped clevis, the straps 5, 6, having perforated ends threaded on the respective arms of the clevis, nuts engaging the screw-threaded ends of the clevis, whereby the straps are held in place, and a spring secured between said straps, substantially as described.

In testimony whereof I sign my name in the presence of two subscribing witnesses.

ENOCH SALISBURY.

Attest:
   J. W. K. McCLURE,
   CAL. H. REEMSNYDER.